(12) United States Patent
Sasaki et al.

(10) Patent No.: US 6,452,746 B1
(45) Date of Patent: *Sep. 17, 2002

(54) TAPE CASSETTE

(75) Inventors: Kazuo Sasaki; Hitomi Chiba, both of Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/498,382

(22) Filed: Feb. 3, 2000

(30) Foreign Application Priority Data

Feb. 5, 1999 (JP) .............................. 11-028067

(51) Int. Cl.$^7$ .............................................. G11B 23/02
(52) U.S. Cl. ...................................................... 360/132
(58) Field of Search ......................... 360/132; 242/344, 242/357

(56) References Cited

U.S. PATENT DOCUMENTS

| | | | |
|---|---|---|---|
| 4,660,105 A | | 4/1987 | Harris et al. |
| 4,734,812 A | * | 3/1988 | Tanaka et al. .............. 360/132 |
| 5,218,502 A | * | 6/1993 | Tanaka et al. .............. 360/132 |
| 5,371,644 A | | 12/1994 | Hoge et al. |
| 5,657,937 A | | 8/1997 | Todd et al. |

OTHER PUBLICATIONS

Patent Abstracts of Japan vol. 1998, No. 09, Jul. 31, 1998 & JP 10 112161 A (Sony Corp), Apr. 28, 1998.

* cited by examiner

*Primary Examiner*—Robert S. Tupper
(74) *Attorney, Agent, or Firm*—Frommer Lawrence & Haug LLP; William S. Frommer; Matthew K. Ryan

(57) ABSTRACT

In a tape cassette, an erroneous erasing preventive or write protect device includes a plurality of discriminating detectable portions provided in a cassette body or casing and a discriminating plug for opening and closing at least one of the discriminating detectable portions. The discriminating detectable portions are formed collectively in a single indented part with no separating walls.

16 Claims, 15 Drawing Sheets

TAPE CASSETTE

BACKGROUND OF THE INVENTION

The present invention relates to tape cassettes for recording audio or video signals or computer data, and more specifically to a write protect device or erroneous erase preventing device.

As shown in FIGS. 20–24, a tape cassette 101 includes a pair of rotatable tape reels 103 and 104 winding magnetic tape 102, and a cassette body (or case) 105 enclosing the tape reels 103 and 104. At one corner of a lower face 106 of the cassette body 105, there is provided an erroneous erase preventing device (or write protect device) 111 for discriminating a record enable state enabling the recording on the magnetic tape 102 and for preventing recorded data from being erased by error.

The erroneous erase preventing device 111 consists of a detectable portion 112 for discrimination to prevent erroneous erasing (which serves as a detectable portion formed in the bottom 106 of the cassette body 105), and an erroneous erase preventive plug 113 serving as a discrimination plug for opening and closing the detectable portion 112.

The detectable portion 112 is formed by opening a round hole in the bottom 106 of the case 105.

As shown in FIG. 22, the erroneous erasing preventive plug 113 has an open-close portion 114 for opening and closing the detectable portion 112, a slide operating portion 115, and a lock portion 116.

As shown in FIG. 20, the erroneous erasing preventive plug 113 is right-left slidably attached in the cassette body 105 in the state that the slide control portion 115 projects out of an operation opening 108 on the back 107 of the cassette body 105. Thus, the plug 113 is slidable in a right and left direction.

The erroneous erasing preventive plug 113, when the slide operation element 115 is operated to slide to one direction, closes the detectable portion 112 with the open-close portion 114 as shown in FIG. 23, while the lock portion 116 engages in a first lock opening 109 provided inside the case 105 to keep the closing state of the detectable portion 112.

Also, the erroneous erasing preventive plug 113, when operated to slide to direction A shown by an arrow from the state shown in FIG. 23, opens the detectable portion 112 which was closed by the open-close portion 114 as shown in FIG. 24, while the lock element 116 hooks to a second lock opening 110 provided inside the cassette body 105 to lock to keep the opening state of said detectable portion 112.

Then, if the tape cassette 101 is loaded in the recorder-player that is not shown in figures, while in the state that the detectable portion 112 for discrimination to prevent erroneous erasing is closed by the erroneous erasing preventive plug 113, the erroneous erase detecting element provided on the recorder-player is prevented by the erroneous erasing preventive plug 113 from being lead into the cassette body 105 from the detectable portion 112, which enables the recording on the magnetic tape 102 in the tape cassette 101.

Also, if the tape cassette 101 is loaded in the recorder-player, while in the-state that the detectable portion 112 is open, the erroneous erasing detection element provided on the recorder-player is lead into the cassette body 105 from the detectable portion 112, which disables the recording on the magnetic tape 102 in the tape cassette 101 or, in other words, prevents erroneous erasing.

By the way, in addition to the conventional tape cassette (hereinafter called the first format tape cassette) 101 shown in FIGS. 20–24, the tape cassette that enables high-density recording on the magnetic tape (hereinafter called the second format tape cassette) has also been developed.

As shown in FIG. 25, the second format tape cassette 201, like the first format tape cassette 101, is provided with a pair of tape reels 203 and 204 with magnetic tape 202 wound around them that are rotatably accommodated in the cassette body 205, and, in one corner in the bottom 206 of the cassette body 205, there is provided with an erroneous erasing preventive device 211.

The erroneous erasing preventive device 211 consists of a detectable portion 212 for discrimination or identification to prevent erroneous erasing and an erroneous erasing preventive plug 213 which closes/opens the detectable portion 212.

The detectable portion 212 is formed by opening a round hole in the bottom 206 of the cassette body 205.

The erroneous erasing preventive plug 213 is formed roughly in the same way as the erroneous erasing preventive plug 113 of the first format tape cassette 101, and when it is operated to slide to one direction, closes the detectable portion 212, while when it is operated to slide to the other direction, releases open the detectable portion 212.

The cassette body 105 of the first format tape cassette 101 is also used as the cassette body 205 of the second format tape cassette 201.

The detectable portion for identification to prevent erroneous erasing 212 of the second format tape cassette 201 is formed, near the detectable portion 112 for identification to prevent erroneous erasing of said first format tape cassette 101, with a predetermined spacing D between the portion 212 and the portion 112.

Because of the development of magnetic materials and the reduction in thickness of magnetic recording layers enabled by the recent technological advances, the third format tape cassette that enables higher-density recording than said second format tape cassette 201 has also been developed.

By the way, in attempting to use, as the cassette body of the third format tape cassette, the cassette body 205 of the second format tape cassette 201, the following problems have been arisen.

(1) As shown in FIG. 26, in attempting to form the detectable portion for identification to prevent erroneous erasing 312 for the third format tape cassette between the detectable portion for identification to prevent erroneous erasing 112 for the first format tape cassette and the detectable portion for identification to prevent erroneous erasing 212 for the second format tape cassette provided on the bottom 306 of the cassette body 305 of the third format tape cassette 301, these three detectable portions 112, 212 and 312 become close in distance, therefore, as shown in FIG. 27, the thickness t of the separating walls 321 between the detectable portions 112, 212 and 312 become thinner, which often results in defective products during forming process and reduces efficiency in production. Moreover, the separating walls 321 are easy to break during usage.

(2) If the detectable portion 312 for the third format tape cassette of the cassette body 305 is formed sufficiently away from the detectable portions 112 and 212, the above-mentioned first problem (1) will be solved. However, the bottom plate 306 of said cassette body 305 is formed with various holes such as detection hole for magnetic tape type 331, cassette positioning holes 332 and 333, detection hole for recording format 334, detection hole for tape end 335. Therefore, there are imposed constraints in space. Also, in the case that the detectable portion 312 for the third format tape cassette is formed at a distance from the detectable portions 112 and 212, the position of the detection element for erroneous erasing of the recorder-player unit must also be moved in conformity with the position of the detectable portion 312 for the third format tape cassette. Again, on the recorder-player unit, the change of the position of the detection element for erroneous erasing is also subjected to constraints in space, and difficulties in terms of cost.

SUMMARY OF THE INVENTION

From the above viewpoints, it is desirable to form the detectable portions for identification to prevent erroneous erasing 112, 212 and 312 for the first, second, and third format tape cassettes together in a single space of the cassette body 305.

Therefore, it is an object of the present invention to provide tape cassettes having a plurality of discriminating detectable portions formed closed in a narrow area.

According to the present invention, a tape cassette comprises: a casing formed with a plurality of discriminating detectable portions; and a discriminating plug slidably disposed in the casing, for moving into and out of at least one of the discriminating detectable portions. The discriminating detectable portions are collectively formed in a single cavity, and the discriminating plug faces at least one of the discriminating detectable portions in the recess.

DETAILED DESCRIPTION OF THE INVENTION

Figure 1:
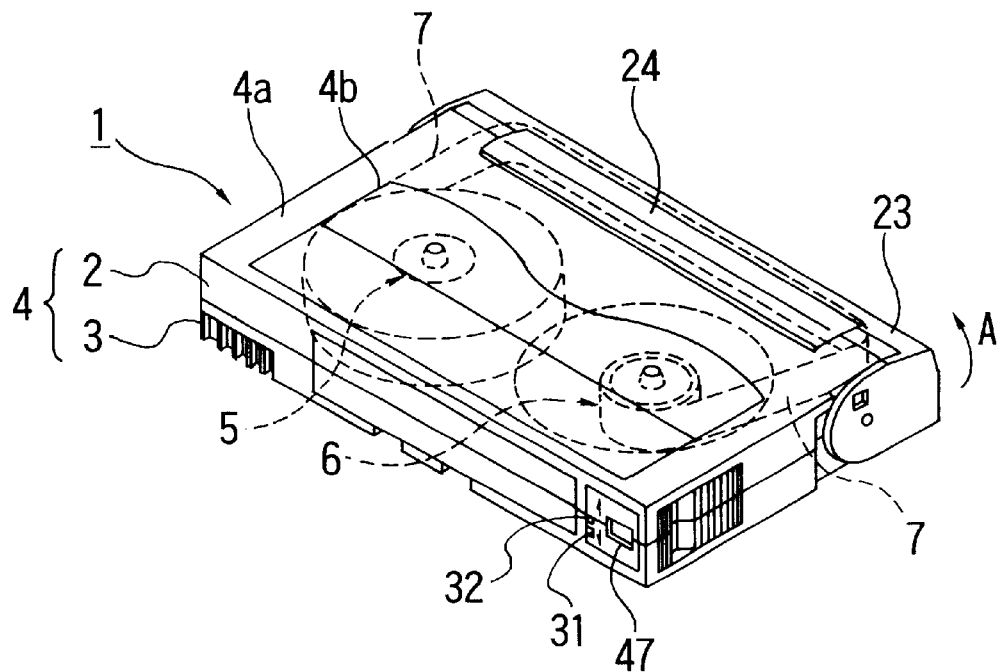
FIG. 1 is a perspective view of a tape cassette according to one embodiment of the present invention as view from the upper side.
Figure 3:
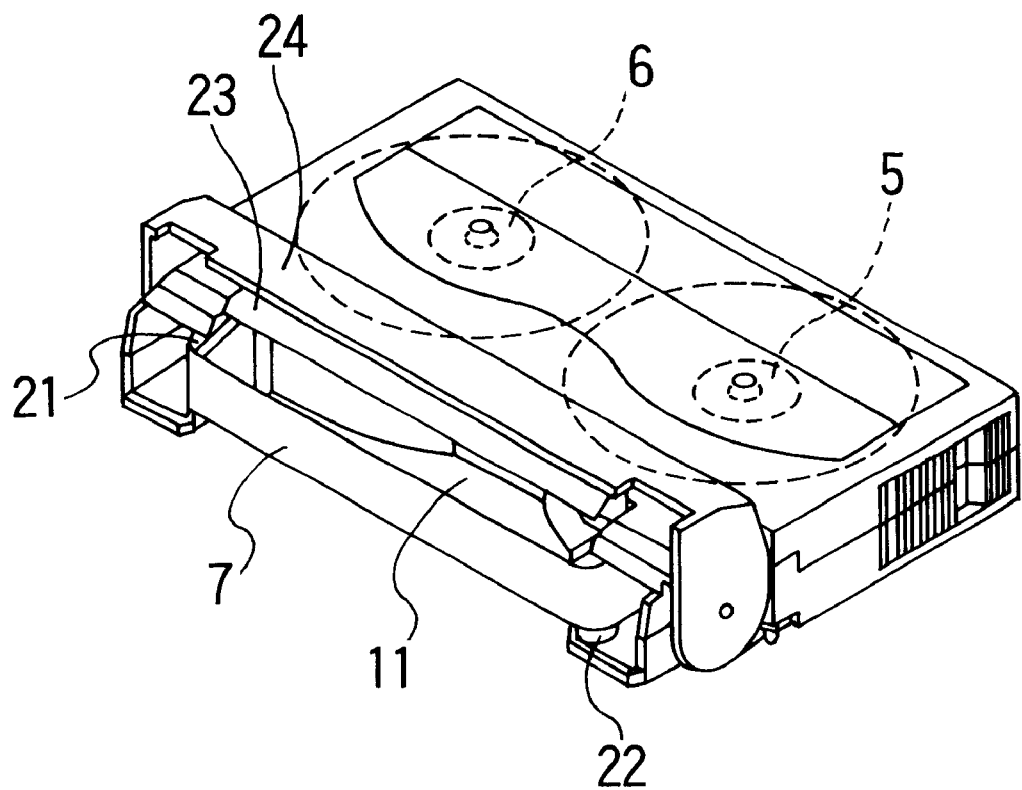
FIG. 3 is a perspective view of the tape cassette of FIG. 1 with a lid being open.
Figure 4:
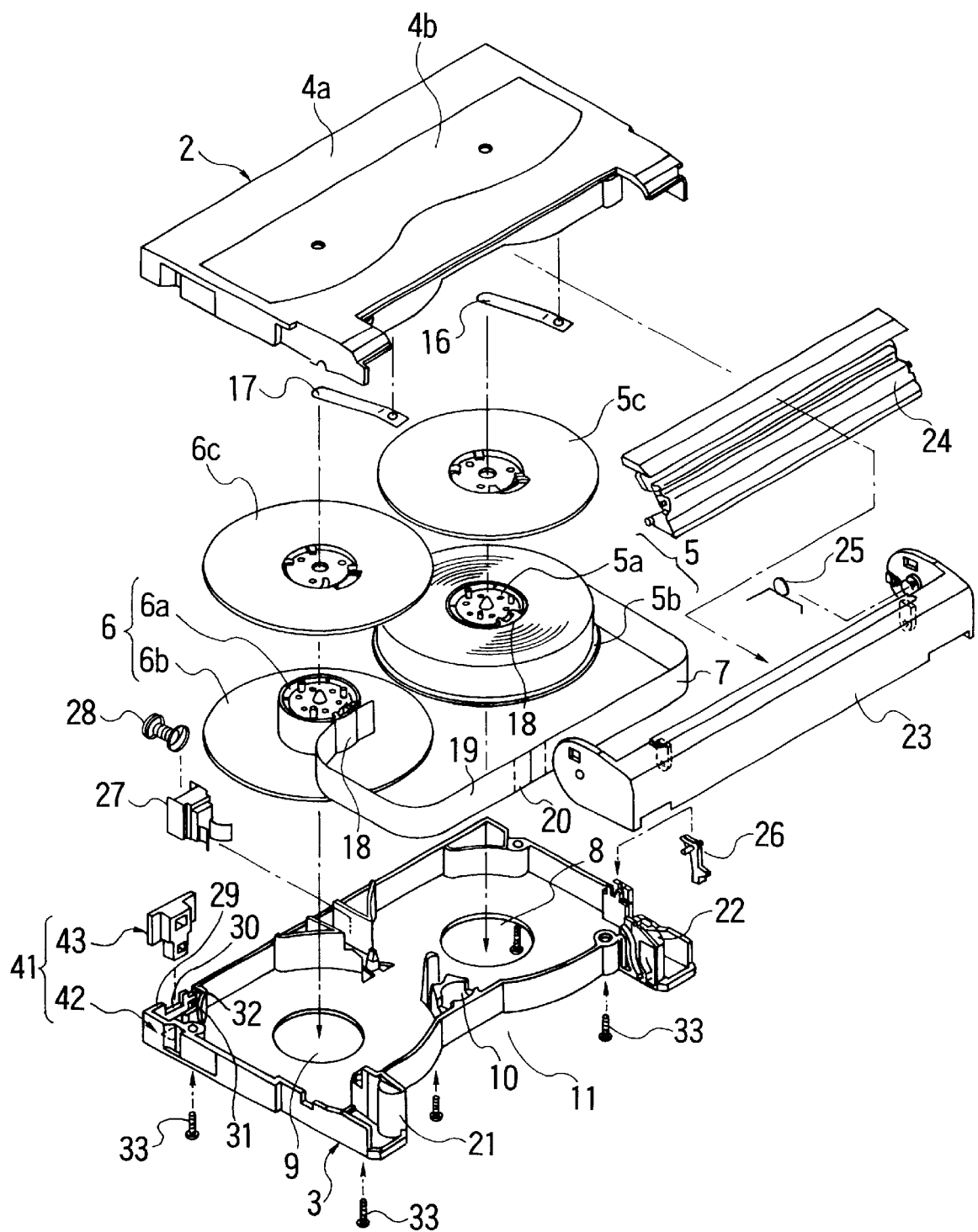
FIG. 4 is an exploded perspective view of the tape cassette of FIG. 1.
Figure 5:
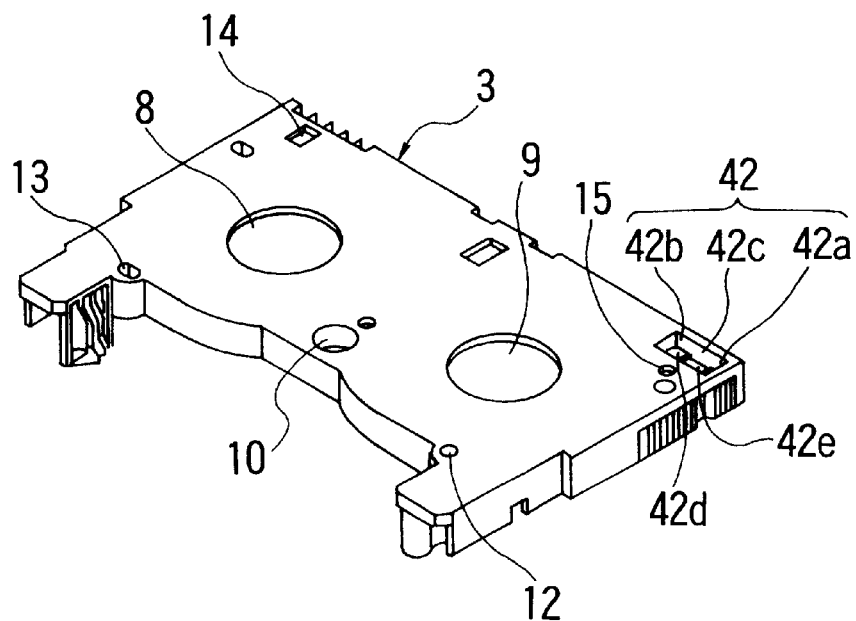
FIG. 5 is a perspective view showing a bottom side of a lower half of the tape cassette of FIG. 1.

FIGS. 1~19 shows a tape cassette 1 according to one embodiment of the present invention. FIG. 1 is a perspective view from the top, FIG. 2 is a perspective view from the bottom, FIG. 3 is a perspective view with a lid open, FIG. 4 is an exploded perspective view, and FIG. 5 is a perspective view of the lower half from the bottom.

Figure 2:
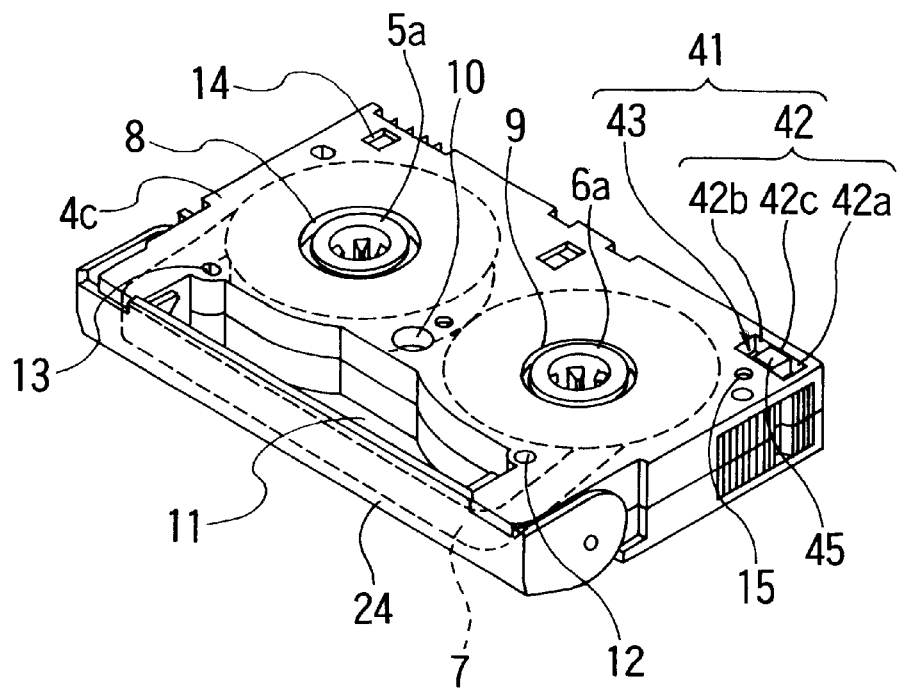
FIG. 2 is a perspective view of the tape cassette shown in FIG. 1, as viewed from the lower side.

As shown in FIG. 2, the tape cassette 1 includes an erroneous erasing preventive device (or write protection device) 41 serving as means for protecting recorded information from being erased inadvertently, or as a cassette discriminating or identification means. The device 41 is formed on the bottom side.

The erroneous erasing preventive device 41 of this example comprises an indented part (or cavity) 42 as a detectable element unit which includes three discriminating detectable portions or elements for discrimination or identification 42a–42c put together (continuously without separating walls), and an erroneous erasing preventive plug 43, as an discriminating or identification plug, placed to face the indented part 42.

Figure 20:
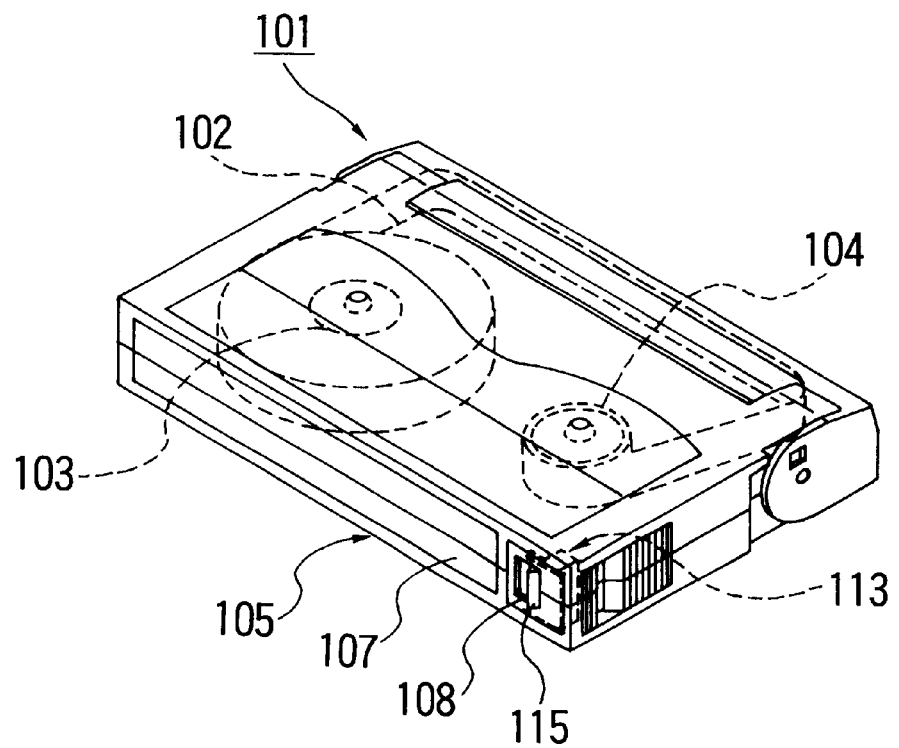
FIG. 20 is a perspective view showing the upper side of a conventional first-format tape cassette.
Figure 21:
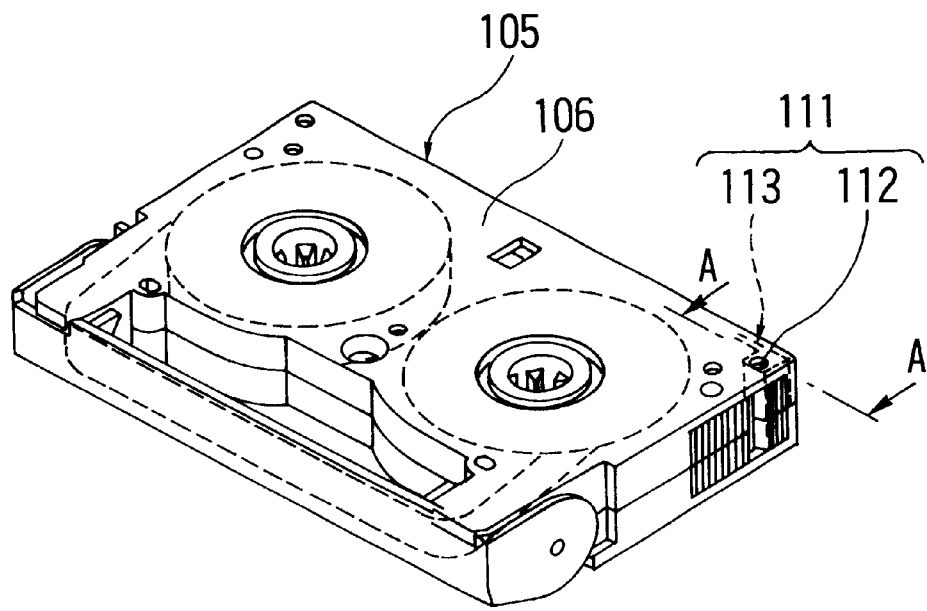
FIG. 21 is a perspective view showing the lower side of the conventional first-format tape cassette.
Figure 22:
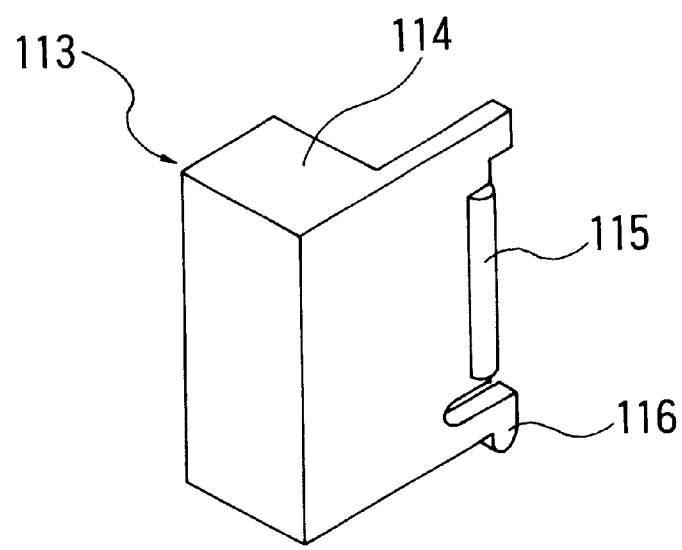
FIG. 22 is a perspective view showing an erroneous erasing preventive plug of the tape cassette shown in FIGS. 20 and 21.
Figure 23:
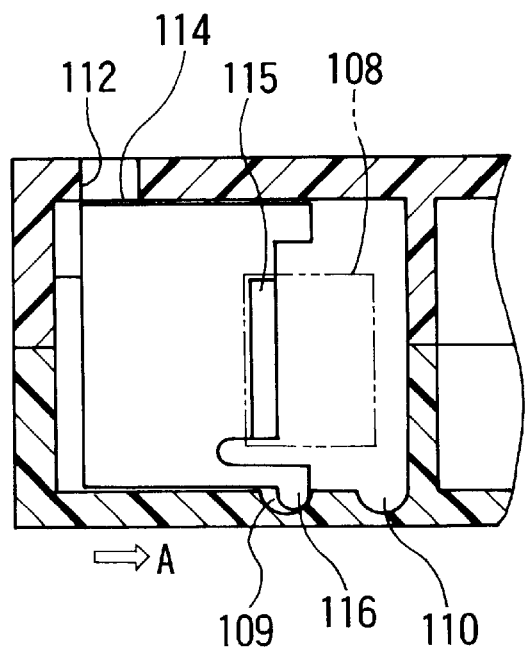
FIG. 23 is a sectional view showing the erroneous erasing preventive plug of FIG. 22 in a first position.
Figure 24:
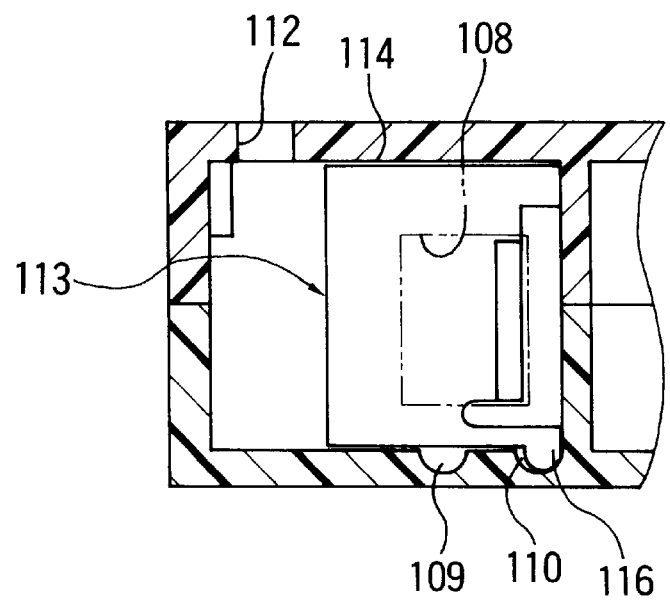
FIG. 24 is a sectional view showing the erroneous erasing preventive plug of FIG. 22 in a second position.

The first discriminating detectable portion 42a is formed at the position corresponding to the first format detectable portion 112 of the first format tape cassette 101 shown in FIGS. 20–21.

Figure 25:
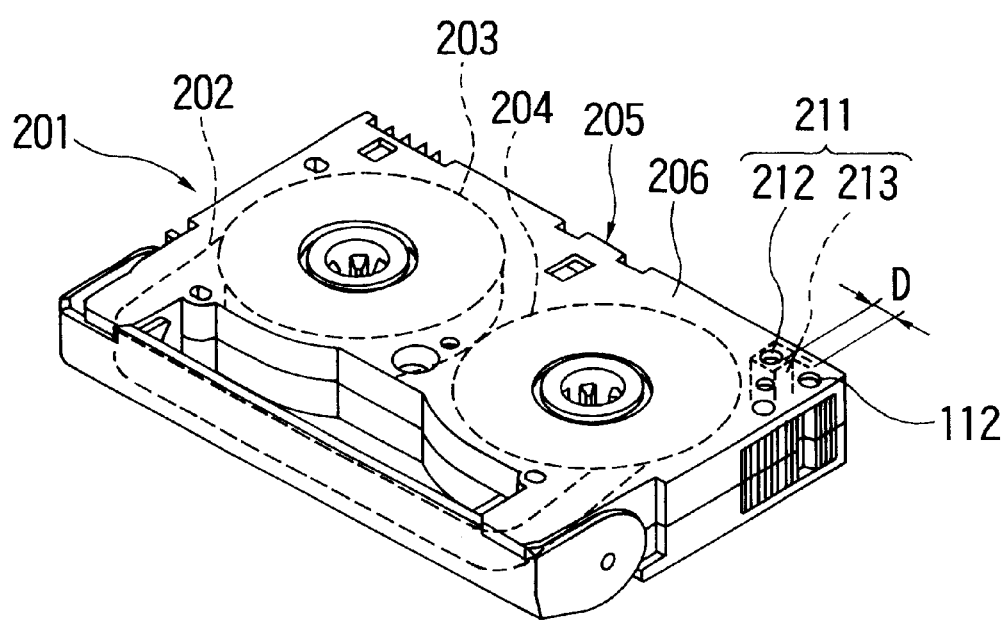
FIG. 25 is a perspective view showing a conventional second-format tape cassette.

The second discriminating detectable portion 42b is formed at the position corresponding to the second format detectable portion 212 of the second format tape cassette 201 shown in FIG. 25.

Figure 26:
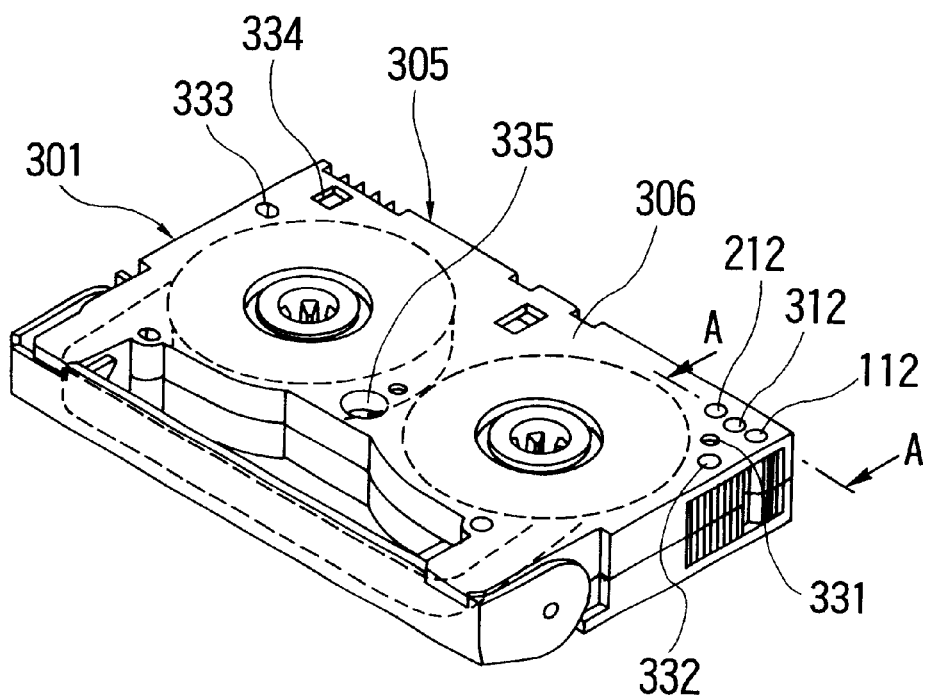
FIG. 26 is a perspective view showing a conventional third-format tape cassette.
Figure 27:
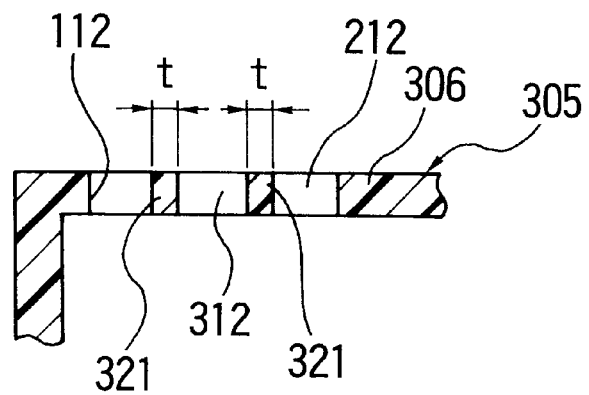
FIG. 27 is a sectional view taken across a line A—A in FIG. 26.

The third discriminating detectable portion 42c is formed at the position that corresponds to the third format detectable portion 312 of the third format tape cassette 301 shown in FIG. 26.

The erroneous erasing preventive plug 43 of this example is provided at the position facing the third detectable portion 42c of the indented part 42, and arranged to slide into the detectable portion 42c to close it or slide out of the detectable portion 42c to open it.

The tape cassette 1 of the present invention is explained in detail in the following three sections: 1 . . . Overall Structure of the Whole Cassette, 2 . . . Erroneous Erasing Preventive Means, and 3 . . . Variations.

1 . . . Overall Structure of the Whole Cassette

The tape cassette 1 has the cassette body or casing 4 including the upper half 2 and the lower half 3, a pair of tape reels 5 and 6 rotatably installed in the cassette body 4, and the magnetic tape 7 wound around those tape reels 5 and 6.

Each of the upper and lower halves 2 and 3 of said cassette body 4 is integrally formed by injection molding of resin to have enough size to rotatably accommodate the pair of tape reels 5 and 6 with the magnetic tape 7. The upper and lower halves 2 and 3 are joined together with their respective openings butted against each other, to form the box-shaped cassette body 4.

The upper face 4a of the cassette body 4 is formed with a transparent window 4b for making visible the wound magnetic tape 7 in the cassette body 4.

In the bottom face 4c of the cassette body 4, as shown in FIG. 2, portions of hubs 5a, 6a of the tape reels 5, 6 are exposed to outside, and there are provided hub engagement holes 8 and 9 to regulate the rotation of the tape reels 5 and 6. These hub engagement holes 8, 9 are positioned to correspond to the tape supply reel 5 and tape take-up reel 6, respectively, and formed as round holes having the diameter approximately equal to the outside diameters of the hubs of the tape reels 5 and 6.

The bottom face 4c of the cassette body 4 is further formed with a light emitting element inserting hole 10 through which the light emitting element of the light detection mechanism on the side of recorder-player unit is aimed into this cassette body 4. The light emitting element inserting hole 10 is a round hole positioned to confront the light emitting element provided in the recorder-player unit. In other words, the light emitting element inserting hole 10 is positioned near the tape leading indented part 11 cut in the front face of the cassette body 4 where the tape leading pin of the recorder-player unit is inserted, and the hole 11 is roughly in the middle between the tape reels 5 and 6.

The bottom face 4c of the cassette body 4 is further formed with cassette positioning holes 12, 13 where the cassette positioning pins of the recorder-player unit is inserted in order to set the position of the tape cassette 1 in relation to the recorder-player unit. These cassette positioning holes 12 and 13 are formed as a round hole and an elliptical hole respectively near the left and right ends of the tape leading indented part 11.

The bottom face 4c of the cassette body 4 is further provided with a recording format detection hole 14. The detection hole 14 is positioned at the corner of the cassette body 4 near one hub engagement hole 8, and formed as a small rectangle blind hole. At the opposite corner of the cassette body 4, a detection hole 15 is provided to identify the tape type. This detection hole 15 is formed as a small round hole. In the region adjacent to this detection hole 15, there is formed the indented part 42 in which the first to third detectable portions 42a–42c are collectively formed as a single continuous cavity.

As shown in FIG. 4, each of the tape reels 5 and 6 has a cylindrical hub 5a or 6a on which the magnetic tape 7 is wound, a disk-shaped lower flange 5b or 6b at a lower end of the hub 5a or 6a, and a transparent upper flange 5c or 6c at an upper end of the hub 5a or 6a . . . Each reel 5 or 6 is rotatable with the upper end of the hub 5a or 6a provided in the corresponding hub engagement hole 8 or 9 formed in the bottom face 4c of the cassette body 4. Each tape reel 5 or 6 is pushed in the axial direction by a reel holding spring 16 or 17 attached to the upper half 2 at the center of rotation of said hub 5a or 6a, in order that the rattling of the tape reels 5 and 6 is reduced.

The magnetic tape 7 is connected to each tape reel 5 or 6 by a transparent leader tape 19 having one end connected with the tape 7 and the other end fixed on the hub 5a or 6a by a damper 18. The magnetic tape 7 and leader tape 19 are connected by a transparent thin connection tape 20, called splice tape, having a sticky layer on one side.

The magnetic tape 7 is guided by semicircular tape guide members 21 and 22 provided on both sides of the tape leading indented part 11 of the cassette body 4 and stretched rectilinearly across the tape leading indented part 11.

The magnetic tape 7 is stretched between a front lid 23 and a back lid 24 for protecting the magnetic tape 7 from dust and an external force when the tape cassette 1 is not in the loaded state in the recorder-player unit. These front lid 23 and back lid 24, when the cassette is not in the loaded state, cover the tape leading indented part 11 with the magnetic tape 7 therebetween. When the cassette is set in the recorder-player unit, the front and back lids 23 and 24 are rotated in the direction A indicated by an arrow in FIG. 1, to expose the magnetic tape 7 in the front of the tape leading indented part 11 shown in FIG. 3.

As shown in FIG. 4, a return coil spring 25 urges the front lid 23 in the direction to close the tape leading indented part 11. A lid lock 26 is designed to lock the front lid 23 in the closed position closing the indented part 11.

A reel lock 27 is for locking the tape reels 5 and 6 nonrotatable. A coil spring 28 urges the reel lock 27 in the direction for reel locking.

The lower half 3 is provided with the erroneous erasing preventive device 41 in one corner of the bottom.

A plug receiving cavity (or chamber) 29 is formed in the cassette body 4 of the upper and lower halves 2 and 3. The erroneous erasing preventive plug 43 is received in the plug receiving cavity 29 so that the plug 43 can slide up and down. On the back side of the cassette body 4, there is formed an operation window 30 through which the erroneous-erasing preventive plug 43 is operated from outside. There are further formed first and second lock windows 31, 32 for locking the erroneous erasing preventive plug 43 at record enable position and a record disable position, respectively.

After assembled with the tape reels 5 and 6, reel holding spring 16 and 17, front and back lid 23 and 24, return coil spring 25, lid lock 26, reel lock 27, coil spring 28, and erroneous erasing preventive plug 431 the upper 5 and lower halves 2 and 3 are fastened together by screw members 33 into a tape cassette.

2 . . . Erroneous Erasing Preventive Means

The erroneous erasing preventive device 41 of this example includes the erroneous erasing preventive plug 43, and the first, second and third detectable portions 42a, 42b and 42c that are formed together as the continuous single indented part or cavity 42.

As shown in FIG. 5, the indented part 42 is formed by arranging the first, second and third detectable portions 42a, 42b and 42c consecutively in a line and uniting these three portions as a single cavity. An opening 42e is formed in the middle of the indented part 42. In this example, the third detectable portion 42c is located between the first and second detectable portions 42a and 42b. The indented part 42 has a bottom 42d. The opening 42e is formed in the middle of the bottom 42d of the indented part 42, so that the third detectable portion 42c is bottomless whereas the first and second detectable portions 42a and 42b are bottomed.

The erroneous erasing preventive plug 43 is installed in the cassette body 4 at the position facing the third detectable portion 42c.

Through the opening 42e, an extension 44 of the erroneous erasing preventive plug 43 moves into the third detectable portion 42c to close the same, and moves out of the third detectable portion 42c to open the same, as detailed later.

Figure 6:
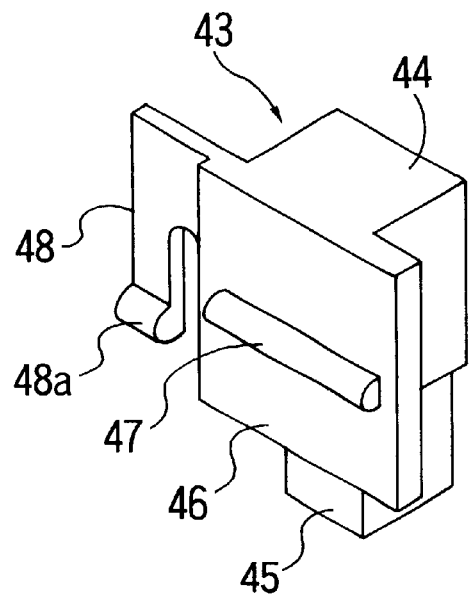
FIG. 6 is a perspective view showing a front side of a discriminating plug of the tape cassette shown in FIG. 1.
Figure 7:
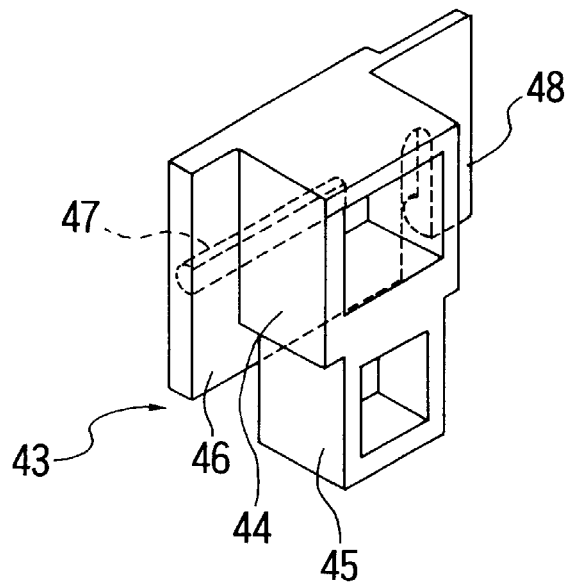
FIG. 7 is a perspective view showing a back side of the discriminating plug of FIG. 6.

As shown in FIGS. 6–7, the erroneous erasing preventive plug 43 includes a main body 44 in the form of a rectangular parallelepiped, the extension (closing portion) 45 projecting from the bottom of the body 44, a slide guide 46 provided on the front side of the main body 44, a slide operating portion 47 provided in the middle of the front side of the slide guide 46, and a lock portion 48 extending from one side of the slide guide 46.

Figure 8:
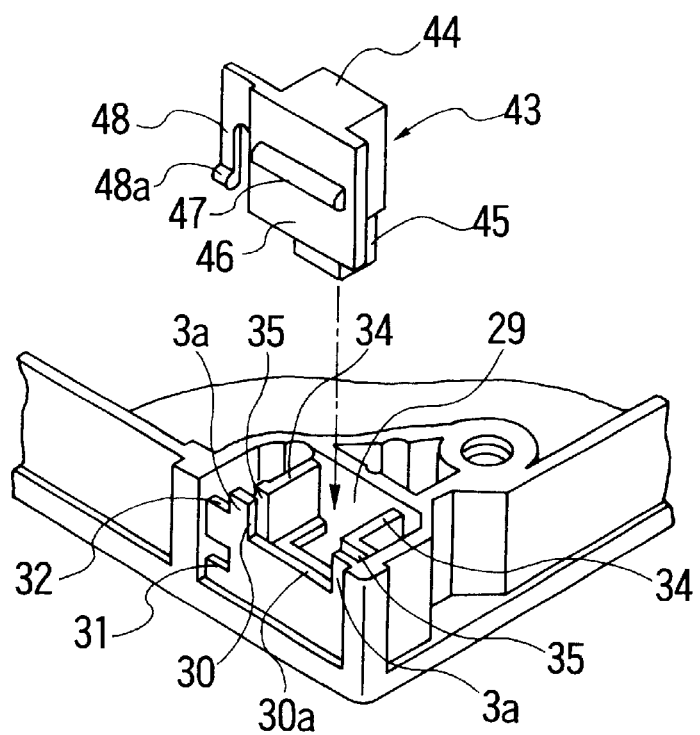
FIG. 8 is a perspective view showing the main portion of the tape cassette which receives the discriminating plug shown in FIGS. 6 and 7.
Figure 9:
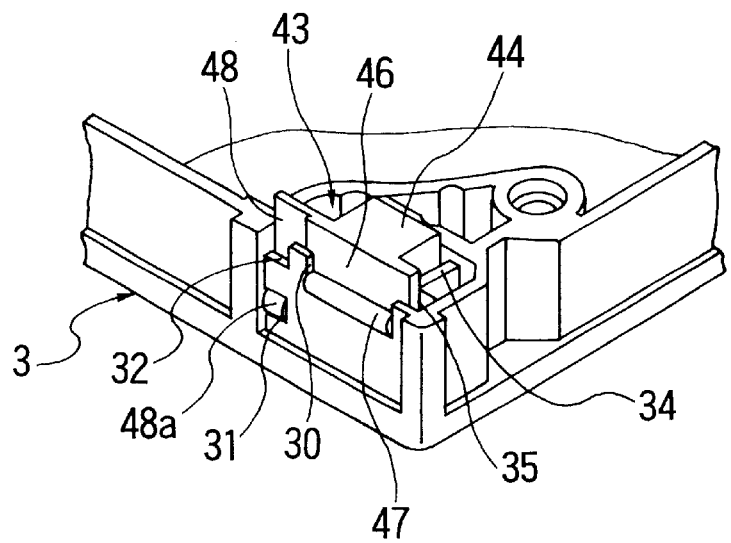
FIG. 9 is a perspective view showing the discriminating plug of FIGS. 6 and 7 in the main portion of the tape cassette.

As shown in FIGS. 8–9, the erroneous erasing preventive plug 43 is inserted in the plug receiving part 29 of the lower half 3.

When the erroneous erasing preventive plug 43 is inserted in the receiving part 29, both ends of said slide guide 42 are lead into slide guide slots 35 each formed between a guide wall 34 and a bottom wall section 3a of the lower half 3, and the slide operating projection 47 is exposed to outside through the slide operating window 30.

When the slide operating part 47 is pushed down manually with the tip of a fingernail or the like, a protrusion 48a of the lock portion 48 is fit into the first lock window 31 to lock the erroneous erasing preventive plug 43 in the pushed-down state.

Figure 10:
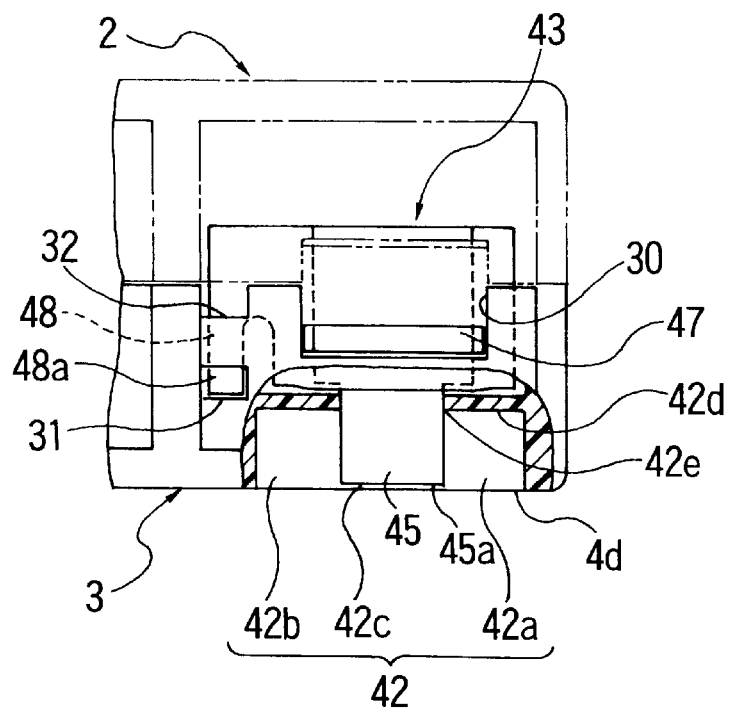
FIG. 10 is a partly cutaway sectional view showing the discriminating plug of FIGS. 6 and 7 in a first position.

In the state in which the erroneous erasing preventive plug 43 is pushed down, as shown in FIG. 10, the extension 45 projects into the third detectable portion 42c from the opening 42e in the middle of the bottom 42d of the plug receiving part 42, and the front face 45a of the extension 45 is approximately flush with the bottom face 4d of the cassette body 4 so that the third detectable portion 42c is entirely closed.

Figure 11:
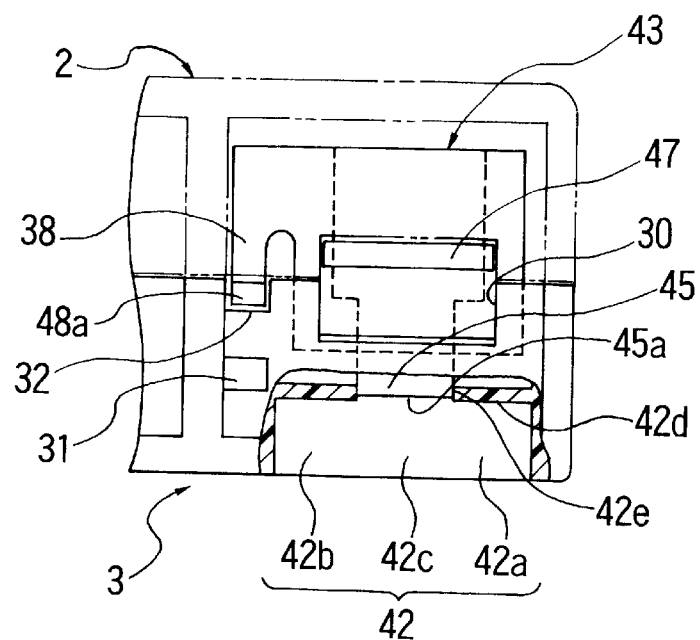
FIG. 11 is a partly cutaway sectional view showing the discriminating plug of FIGS. 6 and 7 in a second position.

When, from the state shown in FIG. 10, the slide operating portion 47 is pushed up manually, as shown in FIG. 11, the protrusion 48a of the lock portion 48 is fit in the second lock window 32 to lock the erroneous erasing preventive plug 43 in the pushed-up state. In this state, the extension 45 is in the upper position, out of the third detectable portion 42c, and the front face 45a of the extension 45 is approximately flush with the bottom 42d of the indented part 42.

The extension 45 is so sized and shaped as to fit in the opening 42e in the bottom 42d of the indented part 42 so that no undesired gap is formed therebetween.

The front face of the slide guide 46 is so sized as to fully close the operation window 30.

The slide operating portion 47 has a semicircular cross sectional shape as shown in FIG. 6, and has such a height that the operating portion 47 cannot project from the back of the cassette body 4.

The lock portion 48 projects from one side of the slide guide 46 like a cantilever, and has a moderate degree of elasticity. The free end of the lock portion 48 is formed with a semicircular engaging protrusion 48a for engaging in the first or second lock window 31 or 32. In this example, the protrusion 48a is colored with a conspicuous color such as red or yellow, to facilitate recognition from outside as to whether the protruding portion 48a is in the first lock window 31 or the second 32, or whether the erroneous erasing preventive plug 43 is in the record enable position or the record disable position. In this case, it is optional to color only the protruding portion 48a, or the entirety of the erroneous erasing preventive plug 43.

Figure 12:
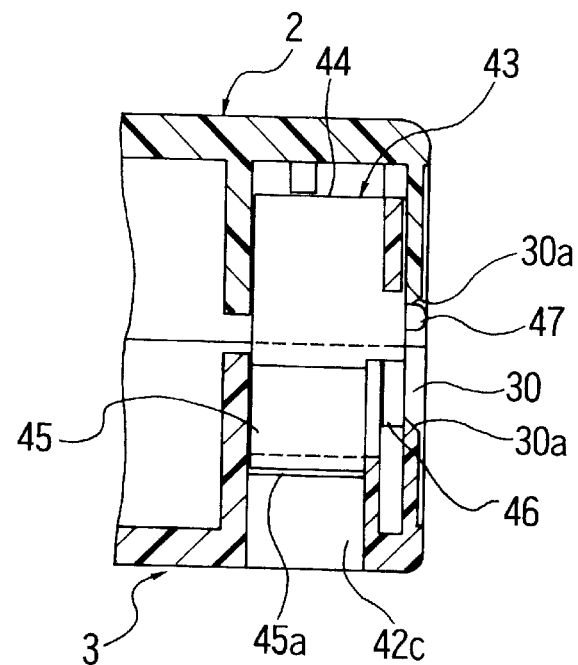
FIG. 12 is a vertical sectional view showing the discriminating plug of FIGS. 6 and 7 in the tape cassette.

The erroneous erasing preventive plug 43 of this example is a single plastic piece. In addition, as shown in FIG. 12, the upper and lower edges of the operating window 30 of the cassette body 4 are chamfered to form an inclined surface 30a, to facilitate manual operation of the slide operating portion 47 of the erroneous erasing preventive plug 43.

Figure 13:
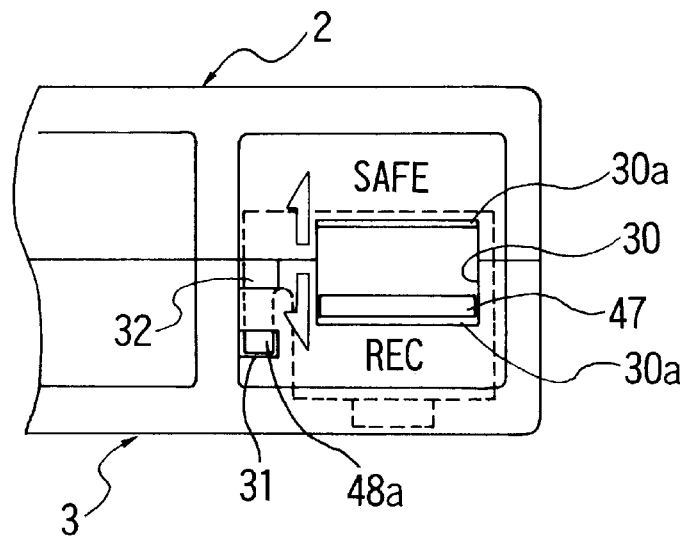
FIG. 13 is a front view showing the main portion of the tape cassette according to the embodiment.
Figure 14:
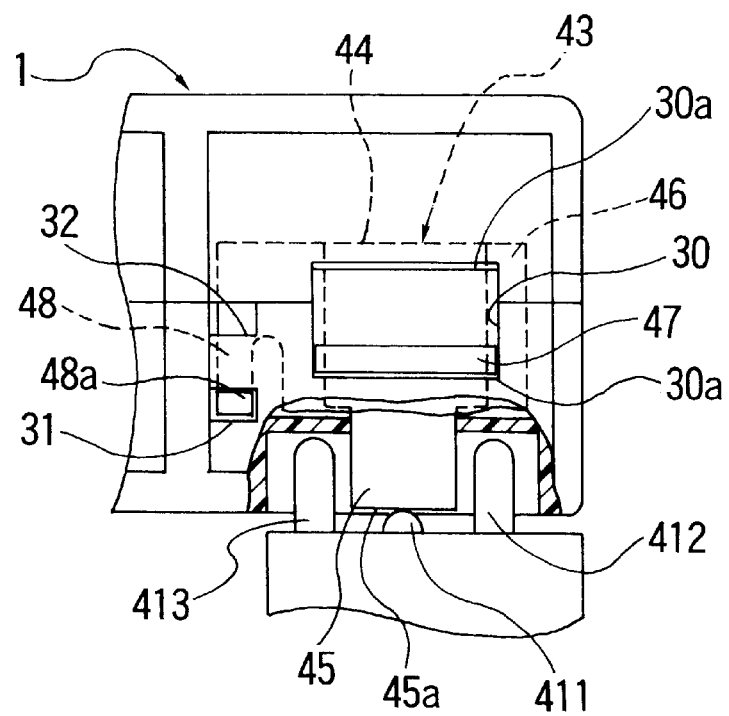
FIG. 14 is a partly cutaway sectional view showing the main portion of the tape cassette according to the embodiment in a first operative state.

The thus-constructed tape cassette 1 according to this embodiment is operated as follows. When the tape cassette 1 is loaded in the recorder-player in the state where the slide operating part 47 is moved to the REC side at the lower end of the operating window 30, as shown in FIG. 13, the under side 45a of the extension 45 of the erroneous erasing preventive plug 43 abuts against a first erroneous erasing detecting element 411 provided in the recorder-player as shown in FIG. 14, and thereby holds the detecting element 411 in the pushed down state to enable the recording to the tape cassette 1. When the tape cassette 1 is loaded in the recorder-player in the state where the slide operating part 47 is moved to the SAFE side at the upper end of the operating window 30, the first erroneous erasing detection element 411 is inserted into the third detectable portion 42c, as shown in FIG. 15, so that the recording to said tape cassette 1 is disabled.

Figure 16:
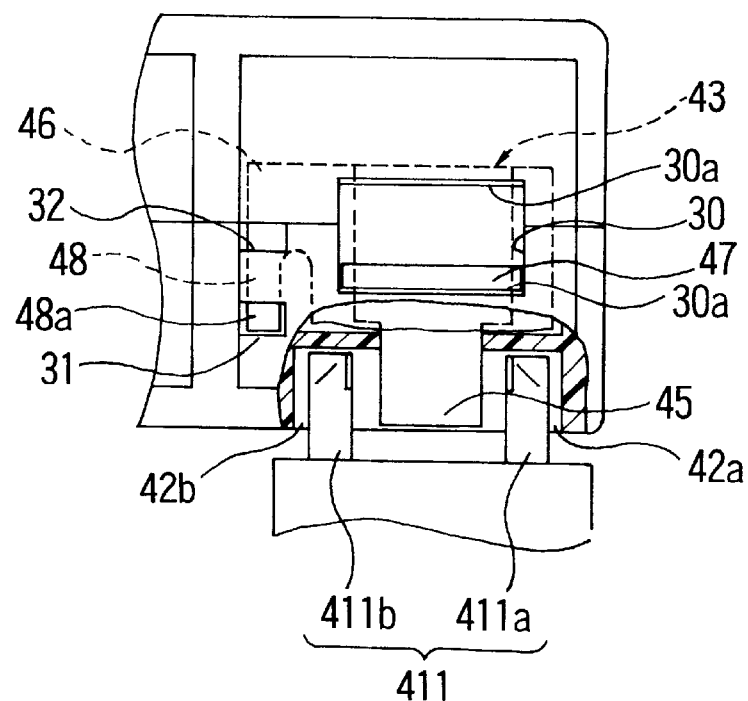
FIG. 16 is a partly cutaway sectional view showing the main portion of the tape cassette according to the embodiment in a third operative state.
Figure 17:
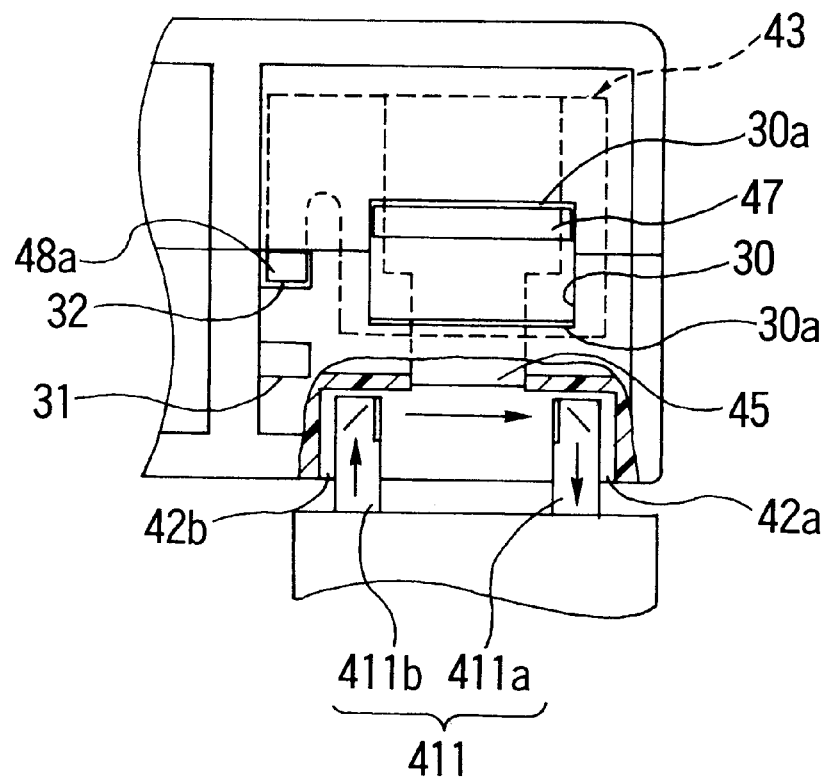
FIG. 17 is a partly cutaway sectional view showing the main portion of the tape cassette according to the embodiment in a fourth operative state.

FIGS. 16–17 show another example using, as the erroneous erasing detection element 411 of the recorder-player, a photo sensor consisting of a light emitting section 411a and a light receiving section 411b. When the tape cassette 1 is loaded in the recorder-player in the state where the slide operating portion 47 is to the REC side, the light emitting section 411a is inserted into the first detectable portion 42a, and the light receiving section 411b is inserted into the second detectable portion 42b as shown in FIG. 16. However, the extension 45 of the erroneous erasing preventive plug 43 intervenes between the light emitting section 411a and the light receiving section 411b, and thereby blocks sensing light emitted from the light emitting section 411a toward the light receiving section 411b, thus, enabling the recording to said tape cassette 1.

When the slide operating part 47 is to the SAFE side, the extension 45 of the erroneous erasing preventive plug 43 is located out of the intervening position between the light emitting section 411a and the light receiving section 411b as shown in FIG. 17, and allows the sensing light emitted from said light emitting section 411a to reach the light receiving part 411b, thus, disabling the recording to the tape cassette 1.

Figure 15:
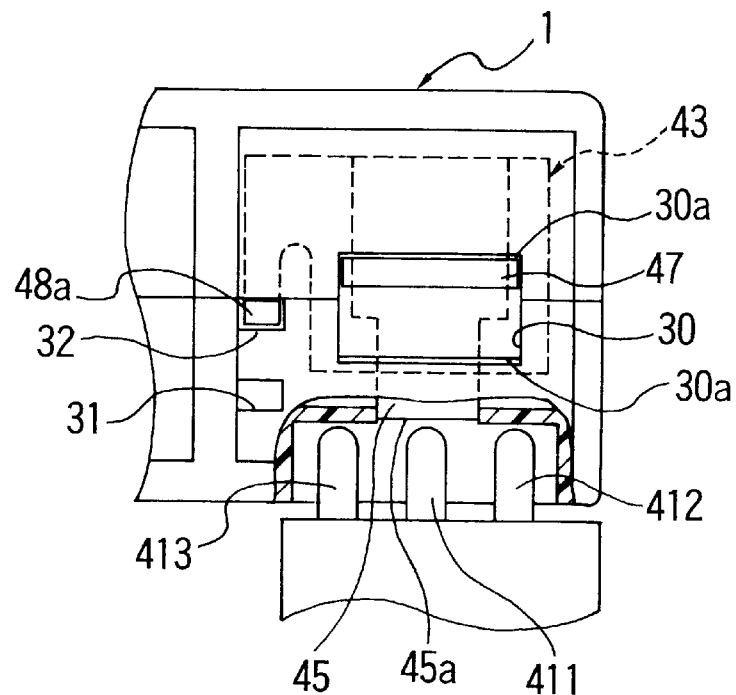
FIG. 15 is a partly cutaway sectional view showing the main portion of the tape cassette according to the embodiment in a second operative state.

The recorder-player shown in FIGS. 14–15 is a so-called downward compatible recorder-player that can accept a tape cassette inferior in recording capacity to the tape cassette 1. This recorder-player has a second erroneous erasing detecting element 412 on one side of the first erroneous erasing detecting element 411 and a third erroneous erasing detecting element 412 on the other side.

When a first format tape cassette 101 as shown in FIGS. 20–21 is loaded in the recorder-player, the second erroneous erasing detection element 412 works to detect if the recording to said first format tape cassette 101 is enabled or disabled. When a second format tape cassette 201 as shown in FIG. 25 is loaded in the recorder-player, the third erroneous erasing detecting element 413 works in the same manner.

3 . . . Variations

Figure 18:
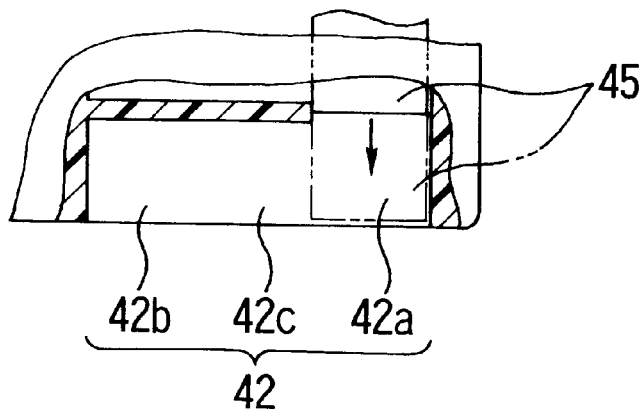
FIG. 18 is a sectional view showing a first variation of the embodiment.
Figure 19:
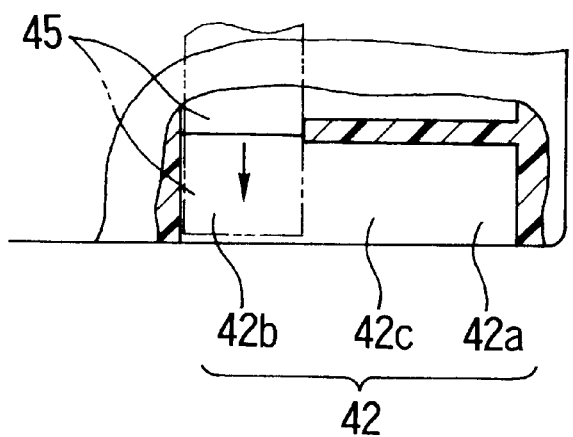
FIG. 19 is a sectional view showing a second variation of the embodiment.

In the example of FIGS. 1–17, the erroneous erasing preventive plug 43 is arranged to open and close the third detectable portion 42c with the extension 45. However, it is optional to arrange the erroneous erasing preventive plug 43 to open and close the first detectable portion 42a, as shown in FIG. 18, or to open and close the second detectable portion 42b as shown in FIG. 19.

In the illustrated embodiment, the indented part 42 consists of the first to third detectable portions 42a–42c. However, it is also possible to form four or more detectable portions in the indented part 42.

The discriminating detectable portions can be used for various purposes such as for discriminating tape type or other conditions.

The tape cassette according to the illustrated embodiment is easy to manufacture, and advantageous in that there are no separation walls separating the detectable portions. The erroneous erasing preventive plug makes it possible to detect the record enable and disable states by moving into one of the detectable portions. The tape cassette allows the use of both the plunger type detecting elements of the recorder-player shown in FIGS. 14 and 15 and the photosensitive type detecting elements shown in FIGS. 16 and 17.

The discriminating plug 43 is arranged to slide up and down. Therefore, as compared to a plug slidable left and right, it is easier to operate and perceive the operating direction of the plug.

The lock portion having the protrusion, the elasticity and the color facilitates the lock and slide operations, and improves the visibility.

What is claimed is:

1. A combination of a recording/reproducing apparatus and a tape cassette for use with a recording/reproducing apparatus, having three separate detectors said combination comprising:
    a tape cassette case; and
    a plurality of discriminating detectable portions formed in the tape cassette case;
    a discriminating plug slidably disposed in the case, for moving into and out of at least one of the discriminating detectable portions;
    wherein said discriminating detectable portions define three continuous discriminating positions which are not separated and are collectively formed in a single cavity with each detectable portion capable of being associated with a separate detector of the recording/ reproducing apparatus, and the discriminating plug faces at least one of the discriminating detecting positions in the recess.

2. A tape cassette according to claim 1 wherein one of the discriminating detectable portions is a write protect portion for preventing erroneous erasure, and the discriminating plug is arranged to move into and out of the write protect portion.

3. A tape cassette according to claim 2 wherein the discriminating detectable positions are first, second and third detectable positions which are aligned in the cavity, the third detectable position is located between the first and second detectable positions, and the third detectable position is the write protect portion for preventing erroneous erasure.

4. A tape cassette according to claim 1 wherein the discriminating plug is vertically slidable in the case between an upper position, wherein the discriminating plug extends from one of the discriminating detectable positions, and a lower position, wherein the discriminating plug closes said one of the discriminating detectable positions, and the discriminating plug comprises a lower projection for closing said at least one of the discriminating detectable positions by moving into said at least one of the discriminating detectable positions in the lower position and for opening said at least one of the discriminating detectable positions by moving out of said at least one of the discriminating detectable positions in the upper position.

5. A tape cassette according to claim 4 wherein the case comprises first and second lock holes formed on a back side of the case, the discriminating plug further comprises a lock portion projecting, in the shape of a cantilever having a predetermined elasticity, to a forward end formed with an engaging projection which is received in the first lock hole, for locking the discriminating plug in the upper position and which is received in the second lock hole, for locking the discriminating plug in the lower position.

6. A tape cassette according to claim 5 wherein each of the first and second holes is a through hole extending from an outside surface of the case to an inside surface of the case, and exposing the engaging projection of the lock portion therethrough when the engaging projection is received therein.

7. A tape cassette according to claim 6 wherein the engaging projection of the lock portion is colored.

8. A combination of a recording/reproducing apparatus and a tape cassette for use with a recording/reproducing apparatus having three separate detectors, said combination comprising:
    a tape cassette case having first and second opposite faces and a discriminating cavity having first, second and third continuous discriminating detecting positions which are not separated and each opening in the first face of the tape cassette case with each detectable portion capable of being associated with a separate detector of the recording/reproducing apparatus; and
    a discriminating plug slidably disposed in at least one of the discriminating detecting positions of the discriminating cavity of the tape cassette case, for moving into and out of the discriminating cavity, the discriminating plug comprising a closing portion for closing one of the discriminating detecting positions of the discriminating cavity and leaving open the remaining two of the discriminating detecting positions of the discriminating cavity.

9. A tape cassette according to claim 8 wherein the discriminating cavity is a single elongated continuous cavity having a bottom formed with a hole, the discriminating plug is slidably received in a receptacle chamber formed behind the bottom of the cavity in such a manner as to allow the closing portion of the discriminating plug to move into and out of one of the space sections of the discriminating cavity through the hole formed in the bottom of the cavity.

10. A tape cassette comprising:
    a case having first and second opposite faces and a discriminating cavity having first, second and third space sections each opening in the first face of the case;
    a discriminating plug slidably disposed in the case, for moving into and out of the discriminating cavity, the discriminating plug comprising a closing portion for closing one of the space sections of the discriminating cavity and leaving open the remaining two of the space sections of the discriminating cavity; and wherein the discriminating cavity is a single elongated continuous cavity having a bottom formed with a hole, the discriminating plug is slidably received in a receptacle chamber formed behind the bottom of the cavity in such a manner as to allow the closing portion of the discriminating plug to move into and out of one of the space sections of the discriminating cavity through the hole formed in the bottom of the cavity.

11. The tape cassette according to claim 10 wherein one of the discriminating detectable portions is a write protect portion for preventing erroneous erasure, and the discriminating plug is arranged to move into and out of the write protect portion.

12. The tape cassette according to claim 11 wherein the discriminating detectable positions are first, second and third detectable positions which are aligned in the cavity, the third detectable position is located between the first and second detectable positions, and the third detectable position is the write protect portion for preventing erroneous erasure.

13. The tape cassette according to claim 10 wherein the discriminating plug is vertically slidable in the case between an upper position, wherein the discriminating plug extends from one of the discriminating detectable positions, and a lower position, wherein the discriminating plug closes said one of the discriminating detectable positions, and the discriminating plug further comprises a lower projection for closing said at least one of the discriminating detectable positions by moving into said at least one of the discriminating detectable positions in the lower position and for opening said at least one of the discriminating detectable positions by moving out of said at least one of the discriminating detectable positions in the upper position.

14. The tape cassette according to claim 13 wherein the case comprises first and second lock holes formed on a back side of the case, the discriminating plug further comprises a lock portion projecting, in the shape of a cantilever having a predetermined elasticity, to a forward end formed with an engaging projection which is received in the first lock hole, for locking the discriminating plug in the upper position and which is received in the second lock hole, for locking the discriminating plug in the lower position.

15. The tape cassette according to claim 14 wherein each of the first and second holes is a through hole extending from an outside surface of the case to an inside surface of the case, and exposing the engaging projection of the lock position therethrough when the engaging projection is received therein.

16. The tape cassette according to claim 15 wherein the engaging projection of the lock position is colored.

* * * * *